US007116156B2

(12) United States Patent
Myono et al.

(10) Patent No.: US 7,116,156 B2
(45) Date of Patent: Oct. 3, 2006

(54) CHARGE PUMP CIRCUIT

(75) Inventors: Takao Myono, Menuma-machi (JP); Yoshitaka Onaya, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 73 days.

(21) Appl. No.: 10/823,004

(22) Filed: Apr. 13, 2004

(65) Prior Publication Data

US 2004/0246044 A1     Dec. 9, 2004

(30) Foreign Application Priority Data

Apr. 14, 2003     (JP)     ............... 2003-108757

(51) Int. Cl.
  *G05F 1/10*     (2006.01)
  *G05F 3/02*     (2006.01)
(52) U.S. Cl. .................................... 327/536
(58) Field of Classification Search ............... 327/536, 327/589; 363/59–60
  See application file for complete search history.

(56) References Cited

U.S. PATENT DOCUMENTS 4,418,332 A * 11/1983 Mefford .................. 340/146.2
5,929,694 A * 7/1999 Yanagawa et al. .......... 327/536
6,486,729 B1 * 11/2002 Imamiya ..................... 327/536
6,515,535 B1  2/2003 Myono ....................... 327/536
2003/0151449 A1 * 8/2003 Nakagawa et al. ......... 327/536

FOREIGN PATENT DOCUMENTS

JP     2001-286125     10/2001

OTHER PUBLICATIONS

J.F. Dickson, "On-Chip High-Voltage Generation in MNOS Integrated Circuits Using an Improved Voltage Multiplier Technique", IEEE Journal of Solid-State Circuits pp. 374-378 (1976).

* cited by examiner

*Primary Examiner*—Quan Tra
(74) *Attorney, Agent, or Firm*—Fish & Richardson PC

(57) ABSTRACT

An inrush current at beginning of operation of a charge pump circuit is reduced to prevent adverse effect on other circuits in a system. Charge transfer MOS transistors are connected in series. One end of each coupling capacitor is connected to each connecting point of the charge transfer MOS transistors. An output from each clock driver is applied on the other end of the respective coupling capacitor. Each clock driver includes a first clock driver and a second clock driver having higher driving capacity than the first clock driver. Each clock driver is controlled so that the first clock driver is put into operation at first and at the end of a predetermined elapsed time it is stopped and the second clock driver is put into operation.

7 Claims, 10 Drawing Sheets

CHARGE PUMP CIRCUIT

CROSS-REFERENCE TO RELATED APPLICATIONS

The priority application Number JP2003-108757 upon which this patent application is based is hereby incorporated by reference.

BACKGROUND OF THE INVENTION

1. Field of the Invention

This invention relates to a charge pump circuit, specifically to a charge pump circuit with large output current capacity used for a power supply circuit and the like.

2. Description of the Related Art

Video equipment in recent years such as a camcorder, a digital still camera (DSC) and a mobile phone with DSC use CCDs (charge-coupled devices) to capture an image. A CCD drive circuit for driving the CCDs requires a power supply circuit that provides both positive and negative high voltages (over 10 volts) and a large current (several milliamperes). A switching regulator has been used for that purpose.

The switching regulator can generate a high voltage with high performance, i.e. with high power efficiency (output power/input power). However, it has a drawback to generate a harmonic noise when switching a current. Therefore, the power supply has to be used with a noise shield. In addition to that, it requires a coil as an external part.

Against this backdrop, attention is being given to a Dickson charge pump circuit as a power supply circuit for portable equipment in recent years. The Dickson charge pump device is described in detail in a technical journal "John F. Dickson 'On-chip High-Voltage Generation in MNOS Integrated Circuits Using an Improved Voltage Multiplier Technique', IEEE JOURNAL OF SOLID-STATE CIRCUITS, VOL. SC-11, NO. 3, pp. 374–378, JUNE 1976", for example.

FIG. 11 shows a circuit diagram of a four-stage Dickson charge pump device. Diodes D1–D5 are connected in series. Each of coupling capacitors $C_1$–$C_4$ is connected to each of connecting nodes of the diodes D1–D5. CL refers to an output capacitor. CLK and CLKB are input clock pulses having opposite phase to each other. The CLK and CLKB are inputted to a clock driver 51. A numeral 52 refers to a current load. The clock driver 51 is provided with a power supply voltage Vdd. Herewith, an amplitude of the clock pulses Φ1 and Φ2 outputted from the clock driver 51 becomes Vdd approximately. The clock pulse Φ1 is fed to the capacitors C2 and C4, while the clock pulse Φ2 is fed to the capacitors C1 and C3.

In a stable state, in which a constant current Iout flows out, an input current to the charge pump circuit is a sum of a current from an input voltage Vin and a current provided from the clock driver. These currents are as described below, disregarding charging and discharging currents to and from stray capacitances. During a period of Φ1=High and Φ2=Low, an average current of 2 Iout flows through each of paths in directions depicted in the figure as solid line arrows.

During a period of Φ1=Low and Φ2=High, an average current of 2 Iout flows through each of paths in directions depicted in the figure as dashed line arrows. An average current of each of these currents over a clock cycle is Iout. A boosted voltage Vout from the charge pump device in the stable state is expressed by a following equation (1), $$V\text{out}=V\text{in}-Vd+n(V\phi'-V1\cdot Vd) \qquad (1)$$

where Vφ' refers to an amplitude of a voltage at each of the connecting nodes induced through the coupling capacitor by a change in the clock pulse. V1 denotes a voltage drop due to the output current Iout and Vin denotes the input voltage which is usually set at Vdd in positive voltage boosting and at 0V in negative voltage boosting. Vd refers to a forward bias diode voltage, and n denotes a number of stages of pumping. Furthermore, V1 and Vφ' are expressed by following equations, $$V1=I\text{out}/(f(C+Cs))=(2\ I\text{out}\ T/2)/(C+Cs)$$

$$V\phi'=V(C/(C+Cs)$$

where C denotes capacitance of each of the coupling capacitances C1–C4, Cs denotes a stray capacitance at each of the connecting nodes, Vφ denotes the amplitude of the clock pulses, f denotes a frequency of the clock pulses and T denotes a clock period of the clock pulses. Power efficiency η of the charge pump device is expressed by a following equation, disregarding charging and discharging currents from/to the clock driver to/from the stray capacitors and assuming Vin=Vdd.

$$\eta=V\text{out}\ I\text{out}/((n+1)\ \text{Vdd}\ I\text{out})=V\text{out}/((n+1)\text{Vdd})$$

In this way, the Dickson charge pump circuit boosts the voltage by successively transferring electric charge to a next stage using the diodes as charge transfer devices. Although the Dickson charge pump circuit has advantages of no need for the coil and low noise, it also has disadvantage of incapability to provide large output current because of its low efficiency.

With this being the situation, the inventors have improved the Dickson charge pump circuit and have developed a charge pump circuit with high efficiency capable of providing large output current (several milliamperes). The improved charge pump circuit adopts MOS transistors for charge transfer instead of the diodes and has a level shift circuit to provide gates of the MOS transistors for charge transfer with level-shifted high voltage clocks to reduce ON resistance of the MOS transistors for charge transfer.

The improved charge pump circuit is described in a Japanese patent document Kokai (unexamined patent publication) No. 2001-286125.

However, an inrush current has presented a problem in putting the improved charge pump circuit into practical use. The coupling capacitors are not provided with sufficient amount of charge at the beginning of operation of the charge pump circuit. Each of the coupling capacitors is charged with enough amount of charge only after predetermined length of time after an input power supply is applied to the charge transfer devices of the charge pump circuit and the clock driver is put into operation. Thus a large inrush current ranging from 100 mA to 1 A flows from the input power supply and a power supply of the clock driver for duration from start of operation of the charge pump circuit until the charge pump circuit reaches a steady state of operation. A stabilized power supply is generally used as a power supply of the charge pump circuit. i.e. the input power supply and the power supply of the clock driver, while the stabilized power supply provides other circuits in the system with power supply.

Therefore when too large inrush current flows through the charge pump circuit, the stabilized power supply is made unstable, the other circuits malfunction, or a protection circuit of the stabilized power supply is activated, resulting in stopping operation of the other circuits.

SUMMARY OF THE INVENTION

The inventors have studied causes of the inrush current and found that the charging and discharging current to and from the coupling capacitors is a dominant cause of the inrush current. To describe more in detail, the power supply of the charge pump circuit provides current to three constituent circuits, i.e. (1) the MOS transistor for charge transfer in a first stage which makes the input portion of the charge pump circuit, (2) the clock driver which provides the capacitors with the clocks, (3) the level shift circuit. The inventors have found that the current flowing through the power supply of the clock driver is dominant.

With this being the situation, a charge pump circuit of this invention includes a first clock driver, a second clock driver which has higher driving capacity than the first clock driver and a clock driver control circuit which controls the clock drivers so that the first clock driver is put into operation first and the second clock driver is put into operation after a predetermined elapsed time. By doing so, the inrush current of the charge pump circuit is reduced and the adverse effect on the other circuits in the system is suppressed, since the inrush current which flows through the power supply of the clock driver at the beginning of the operation is suppressed.

The inrush current at the beginning of operation of the charge pump circuit can be reduced to prevent the adverse effect on the other circuits in the system according to this invention.

DETAILED DESCRIPTION OF THE INVENTION

Figure 1:
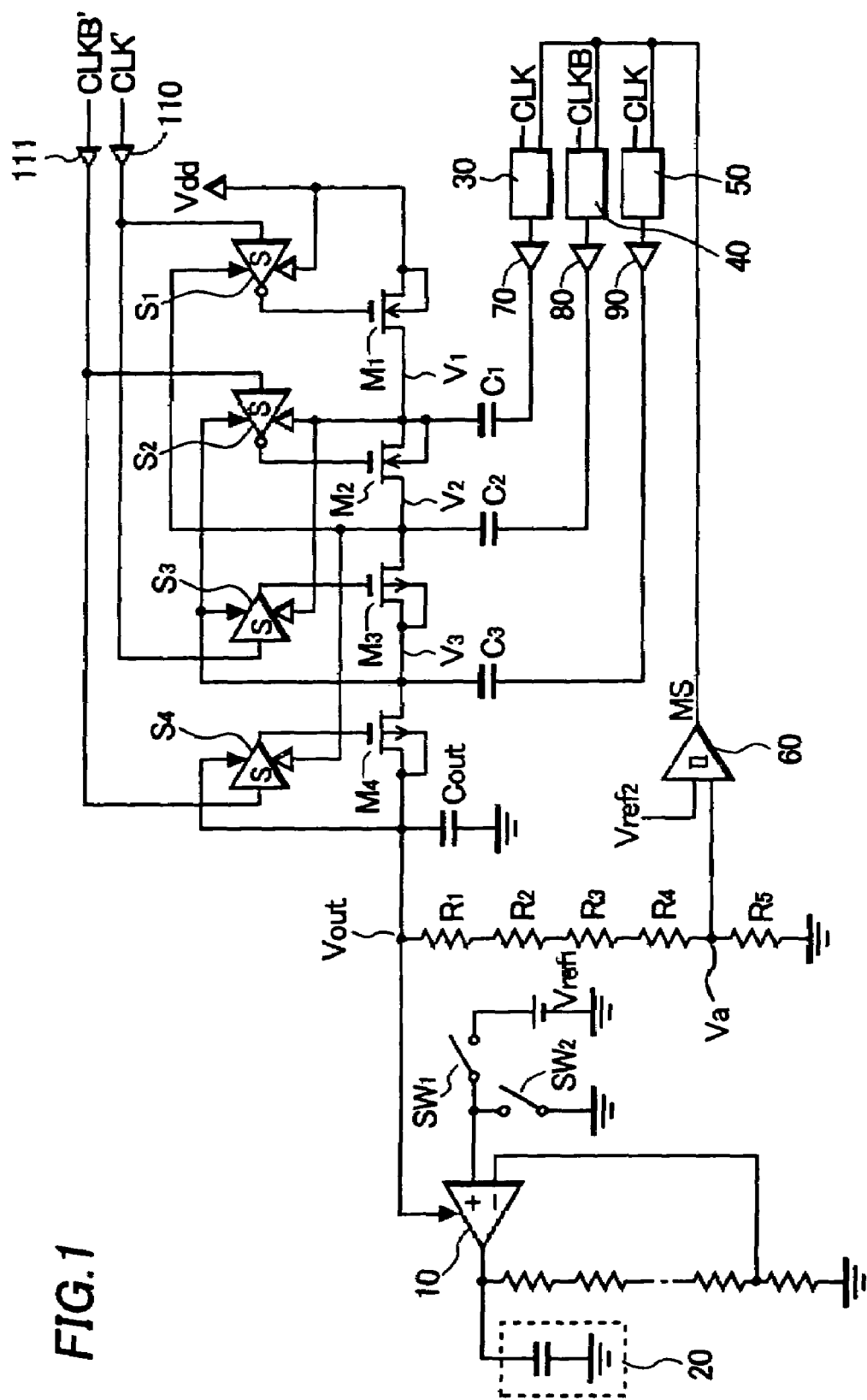
FIG. 1 is a circuit diagram of a charge pump circuit according to a first embodiment of this invention.

Next, a first embodiment of this invention will be described hereafter, referring to the drawings. FIG. 1 is a circuit diagram of a charge pump circuit according to the first embodiment of this invention.

Four charge transfer MOS transistors M1–M4 are connected in series. M1 and M2 in front stages are made of N-channel type transistors, while M3 and M4 in rear stages are made of P-channel type transistors. A drain and a substrate of each of the charge transfer MOS transistors M1–M4 are connected with each other so that a voltage Vgb between a gate and the substrate is equal to a voltage Vgd between the gate and the drain to suppress a back gate bias effect.

A power supply voltage Vdd is provided as an input voltage Vin to the drain of the charge transfer MOS transistor M1 which constitutes a first stage of the charge pump circuit. A boosted voltage Vout is outputted from the drain of the charge transfer MOS transistor M4 in a last stage. A stray capacitance Cout is attached to the drain of the charge transfer MOS transistor M4 as shown in FIG. 1.

The boosted voltage Vout is supplied to a load device 20 after being adjusted to a desired voltage with a regulator 10. The regulator 10 is composed of an operational amplifier, an output of which is divided by resistors and the divided voltage is applied to one of input terminals (−) of the operational amplifier. Either a first reference voltage Vref1 or a ground voltage (0V) is selected by switches SW1 and SW2 and is applied to the other input terminal (+) of the operational amplifier.

One end of each of coupling capacitors C1, C2 and C3 is connected to each connecting point (a pumping node) of the charge transfer MOS transistors M1–M4. A clock pulse CLK is applied to the other end of the coupling capacitor C1 through a control circuit 30 and a clock driver 70. A clock pulse CLKB having opposite phase to the clock pulse CLK is applied to the other end of the coupling capacitor C2 through a control circuit 40 and a clock driver 80. And the clock pulse CLK is applied to the other end of the coupling capacitor C3 through a control circuit 50 and a clock driver 90.

The clock driver 70 has a first clock driver 70A of lower driving capacity and a second clock driver 70B of higher driving capacity as will be described later, and is controlled so that the first clock driver 70A is put into operation at start of operation of the charge pump circuit and the second clock driver 70B is put into operation as the first clock driver 70A stops the operation when the charge pump circuit reaches stable operation. Same applies to the clock drivers 80 and 90.

Switching from the first clock driver 70A to the second clock driver 70B is made when the boosted voltage Vout is detected to have reached a predetermined voltage.

To put it concretely, a comparator 60 is provided to compare a voltage Va obtained by dividing the boosted voltage Vout by resistors R1–R5 with a reference voltage Vref2 and the switching from the clock driver 70A to the clock driver 70B is made by a mode switch signal MS which is an output of the comparator 60.

From start of operation of the charge pump circuit, the voltage Va which is the boosted voltage Vout divided by the resistors gradually increases as the boosted voltage Vout gradually increases. In this process and when Va<Vref2, the mode switch signal MS, which is the output of the comparator 60, is at high level and the control circuit 30 keeps the first clock driver 70A in operation. When Va>Vref2 after a predetermined duration, the mode switch signal MS, which is the output of the comparator 60, is turned to low level and the control circuit 30 stops operation of the clock driver 70A and puts the second clock driver 70B into operation.

The output of the comparator 60 varies depending on the power supply voltage Vdd, if the second reference voltage Vref2 inputted to the comparator 60 is a constant voltage. In order to suppress the power supply voltage dependence, using the power supply voltage Vdd as the second reference voltage Vref2 is preferable. Also the comparator 60 is preferably a hysteresis comparator which is a comparator having hysteresis in order to prevent malfunctioning due to ripples in the boosted voltage Vout which is the output of the charge pump circuit.

The gate of the charge transfer MOS transistor M1 is provided with an output from an inverting level shift circuit S1 while the gate of the charge transfer MOS transistor M2 is provided with an output from an inverting level shift circuit S2. And the gate of the charge transfer MOS transistor M3 is provided with an output from a non-inverting level shift circuit S3 while the gate of the charge transfer MOS transistor M4 is provided with an output from a non-inverting level shift circuit S4. Concrete structures of the inverting level shift circuits S1 and S2 and the non-inverting level shift circuits S3 and S4 will be described later.

Figure 2:
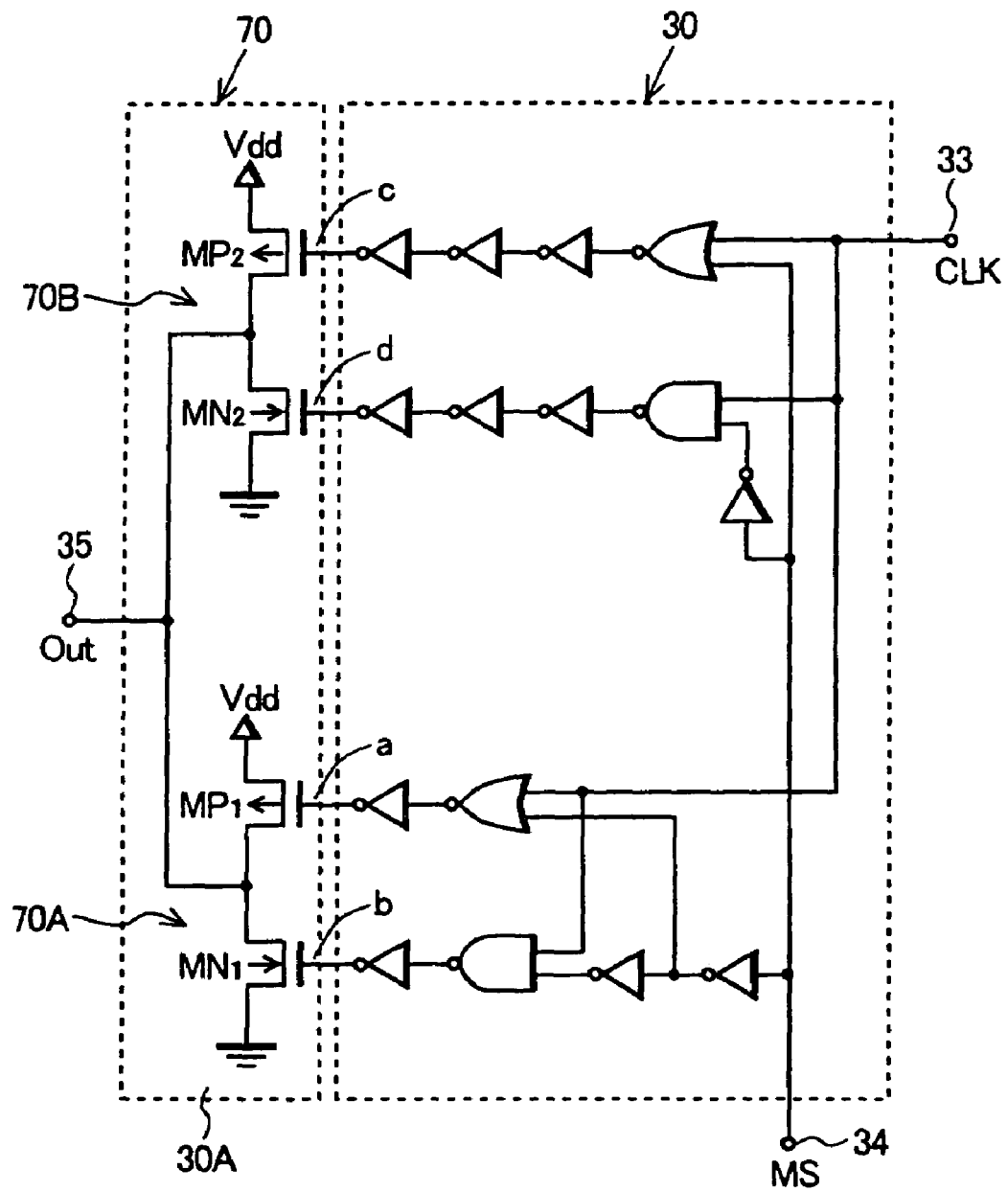
FIG. 2 is a circuit diagram showing a concrete example of a control circuit 30 and a clock driver 70 shown in FIG. 1.

FIG. 2 is a circuit diagram showing a concrete example of the control circuit 30 and the clock driver 70. The other control circuits 40 and 50 and the other clock drivers 80 and 90 have same structures as shown in FIG. 2. The clock driver 70 is composed of the first clock driver 70A having lower driving capacity and the second clock driver 70B having higher driving capacity.

The first clock driver 70A is composed of a P-channel MOS transistor MP1 and an N-channel MOS transistor MN1 connected in series between the power supply Vdd and the ground (0V). An output a of the control circuit 30 is applied to a gate of the P-channel MOS transistor MP1 while an output b of the control circuit 30 is applied to a gate of the N-channel MOS transistor MN1. The driving capacity of the first clock driver 70A is determined by ON resistance of the P-channel MOS transistor MP1 and the N-channel transistor MN1. The driving capacity can be reduced by designing the P-channel MOS transistor MP1 and the N-channel MOS transistor MN1 to have a reduced ratio of GW/GL. GW is a gate width of each of the transistors and GL is a gate length of each of the transistors.

The second clock driver 70B is composed of a P-channel MOS transistor MP2 and an N-channel MOS transistor MN2 connected in series between the power supply Vdd and the ground (0V). An output c of the control circuit 30 is applied to a gate of the P-channel MOS transistor MP2 while an output d of the control circuit 30 is applied to a gate of the N-channel MOS transistor MN2.

And an output of the first clock driver 70A and an output of the second clock driver 70B are connected together to an output terminal 35 which is connected to the other end of the coupling capacitor C1.

Next, operation of the control circuit 30 and the clock driver 70 will be explained. Now it is assumed that the clock pulse CLK is applied to the control circuit 30 through a first input terminal 33 and the mode switch signal MS from the comparator 60 is applied to a second input terminal 34.

When the mode switch signal MS is at high level (Va<Vref2), the clock pulse CLK is outputted from the output terminals a and b though the control circuit 30 without change and applied to the gates of the P-channel MOS transistor MP1 and the N-channel transistor MN1 forming the first clock driver 70A. With this, the first clock driver 70A operates as an inverter. On the other hand, since a high level voltage is outputted from the output terminal c of the control circuit 30 while a low level voltage is outputted from the output terminal d of the control circuit 30, both the P-channel MOS transistor MP2 and the N-channel MOS transistor MN2 forming the second clock driver 70B are turned off to stop operation of the second clock driver 70B.

As a result, the clock pulse CLK is provided to the coupling capacitor C1 through the first clock driver 70A which has lower driving capacity.

For the next step, when the mode switch signal MS is at low level (Va>Vref2), the clock pulse CLK is outputted from the output terminals c and d though the control circuit 30 without change and applied to the gates of the P-channel MOS transistor MP2 and the N-channel transistor MN2 which form the second clock driver 70B. With this, the second clock driver 70B is put into operation. On the other hand, since a high level voltage is outputted from the output terminal a of the control circuit 30 while a low level voltage is outputted from the output terminal b of the control circuit 30, both the P-channel MOS transistor MP1 and the N-channel MOS transistor MN1 which form the first clock driver 70A are turned off to stop operation of the first clock driver 70A.

As a result, the clock pulse CLK is provided to the coupling capacitor C1 through the second clock driver 70B which has higher driving capacity.

This invention is not limited to the embodiment described above in which the control circuit 30 stops the first clock driver 70A and puts the second clock driver 70B into operation as the mode switch signal MS is turned from high level to low level at the end of the predetermined elapsed time from start of operation of the charge pump circuit.

That is, the control circuit 70 may put the second clock driver 70B into operation without stopping the operation of the first clock driver 70A as the mode switch signal MS is turned from high level to low level at the end of the predetermined elapsed time from start of operation of the charge pump circuit. In this case, both the first clock driver 70A and the second clock driver 70B are in operation after the predetermined elapsed time. Changing a logic circuit in the control circuit 30 enables the control described above.

No time is wasted in the embodiment described above, since switching from the first clock driver 70A to the second clock driver 70B is made by detecting that the charge pump circuit gets into the stable operation, i.e. that the boosted voltage Vout of the charge pump circuit reaches the predetermined voltage using the output of the comparator 60. However, in case the charge pump circuit starts operation using the first clock driver 70A having lower driving capacity and the boosted voltage Vout of the charge pump circuit does not reach the predetermined voltage by some reason, the switching of the clock drivers does not take place. Since the driving capacity is not enough with the first clock driver 70A only, the boosted voltage Vout of the charge pump circuit drops when load current starts flowing. As a result, the charge pump circuit might not function as the power supply circuit.

Figure 3:
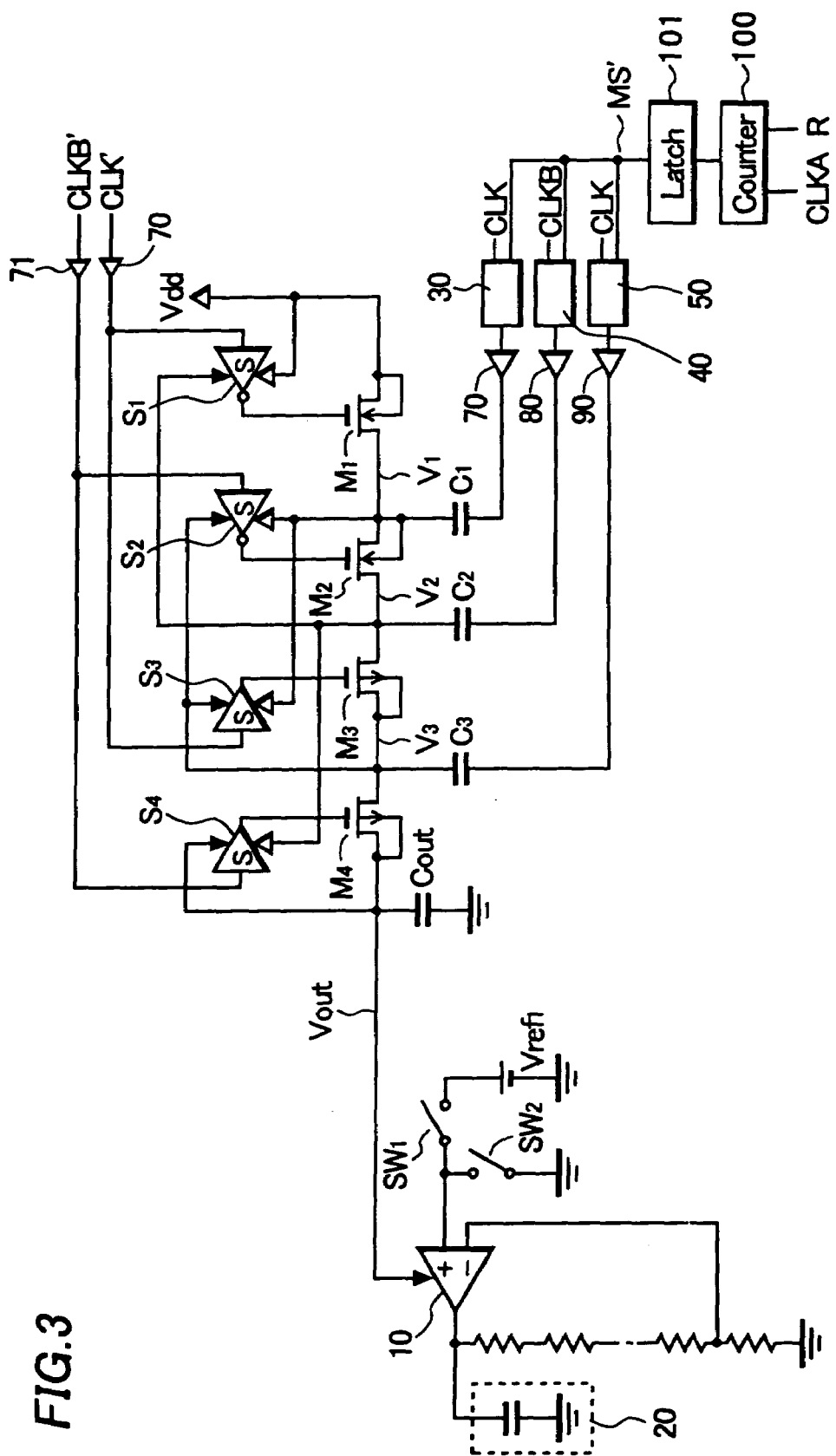
FIG. 3 is a circuit diagram of a charge pump circuit according to a second embodiment of this invention.

With this being the situation, a charge pump circuit according to a second embodiment, in which the first clock driver 70A and the second clock driver 70B are switched using an output of a counter, is introduced and will be described hereafter. FIG. 3 is a circuit diagram of a charge pump circuit according to the second embodiment of this invention. Since the charge pump circuit uses the output of the counter, the first clock driver 70A and the second clock driver 70B are unfailingly switched after a predetermined elapsed time. Thus there is no need to worry that the charge pump circuit might not function as the power supply circuit.

The counter 100 counts a number of risings in the input clock pulse CLK, as shown in FIG. 3. Also the counter 100 is structured to be reset with a reset signal R. An output from a certain bit (an output from a bit for detection) is latched and retained in a latch circuit 101. More specifically, when the output from the certain bit of the counter 100 is inverted from "0" to "1", the latch circuit 101 latches the data "1" and retains it.

The output of the latch circuit 101 is applied to the input terminal 34 of the control circuit 30 as a mode switch signal MS'. The output of the latch circuit 101 is applied to the control circuits 40 and 50 also. That is, the mode switch signal MS', which is the output of the latch circuit 101, is at high level until the count of the counter 100 reaches the predetermined number, and turns to low level when the count exceeds the predetermined number.

By doing so, the control is made so that the first clock driver 70A with lower driving capacity operates until the count of the counter 100 reaches the predetermined number, and the first clock driver 70A stops operation and the second clock driver 70B is put into operation when the count exceeds the predetermined number.

Or, with a modification to the logic circuit in the control circuit 30, the control is performed so that the first clock driver 70A with lower driving capacity is in operation until the count of the counter 100 reaches the predetermined number and both the first clock driver 70A and the second clock driver 70B are in operation when the count of the counter 100 exceeds the predetermined number. Same modification is made to the control circuits 40 and 50 to perform the same control over the clock drivers.

The predetermined number described above is set to a number of counts enabling the first clock driver 70A with lower driving capacity to charge the coupling capacitor C1 completely. The coupling capacitors C2 and C3 are also charged completely in the same way during the same period.

Figure 4A:
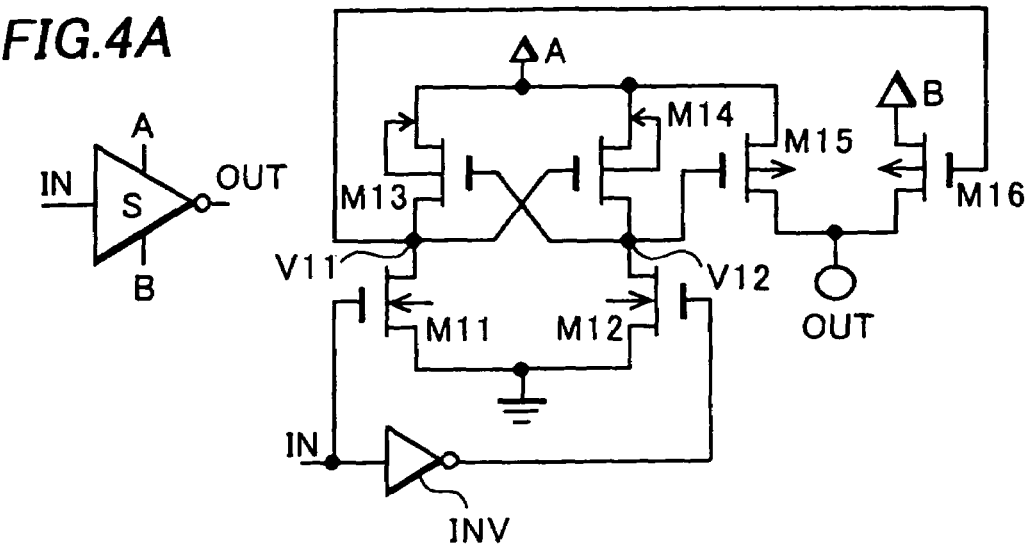
FIGS. 4A and 4B show structures of inverting level shift circuits S1 and S2.
Figure 4B:
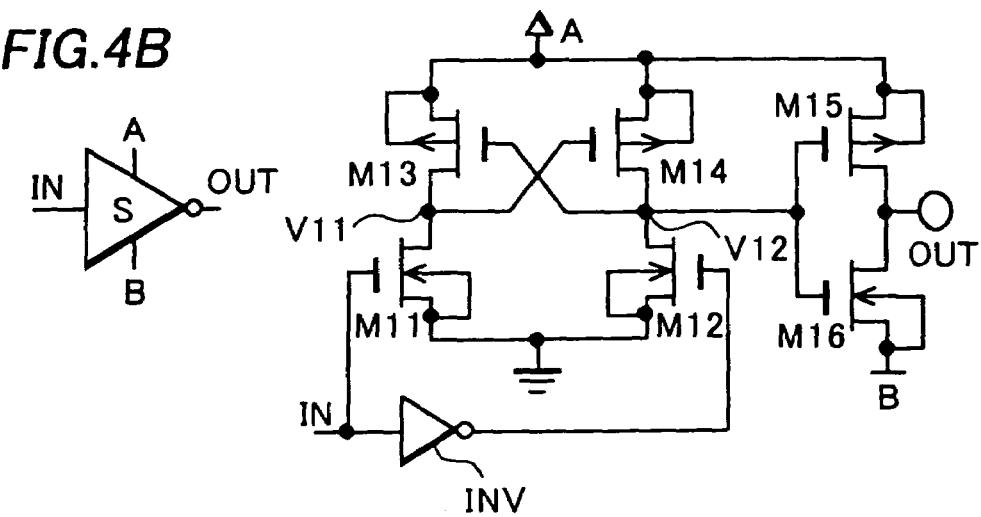
Figure 4C:
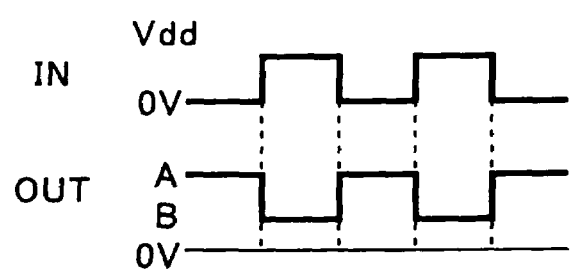
FIG. 4C shows operation waveforms of the inverting level shift circuits.

The circuit diagrams of the inverting level shift circuits S1 and S2 are shown in FIGS. 4A and 4B, and operation waveforms of the inverting level shift circuits S1 and S2 are shown in FIG. 4C. As shown in FIG. 4A, each of the inverting level shift circuits S1 and S2 includes an input inverter INV, differential input MOS transistors M11 and M12 and MOS transistors M13 and M14 which are cross-connected with each other. In addition, each of the inverting level shift circuits further includes pull-up MOS transistors M15 and M16. A gate of the pull-up MOS transistor M15 is supplied with a voltage V12, while an electric potential A is applied to its source.

A gate of the pull-up MOS transistor M16 is supplied with a voltage V11 having opposite phase to the voltage V12, while an electric potential B is applied to its source. The electric potential A is higher than the electric potential B. M11 and M12 are N-channel type high voltage transistors and M13–M16 are P-channel type high voltage MOS transistors.

The MOS transistors M15 and M16 may be modified into an inverter configuration in the level shift circuits having structures described above, as shown in FIG. 4B.

The operation waveforms of the inverting level shift circuits having structures described above are shown in FIG. 4C. The level shift circuits output the electric potential A and the intermediate electric potential B (A>B>0 V) alternately.

Figure 5A:
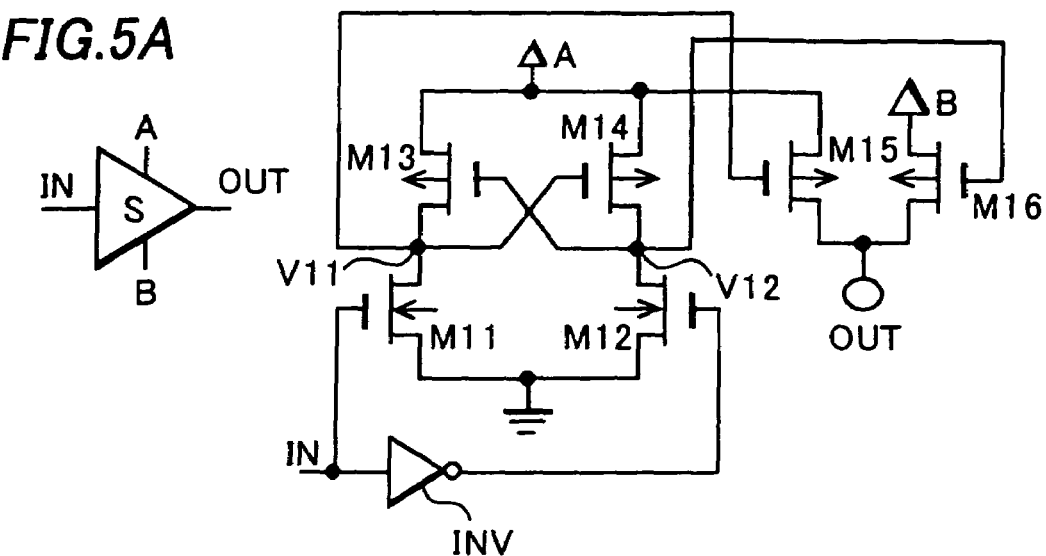
FIGS. 5A and 5B show structures of non-inverting level shift circuits S3 and S4.
Figure 5B:
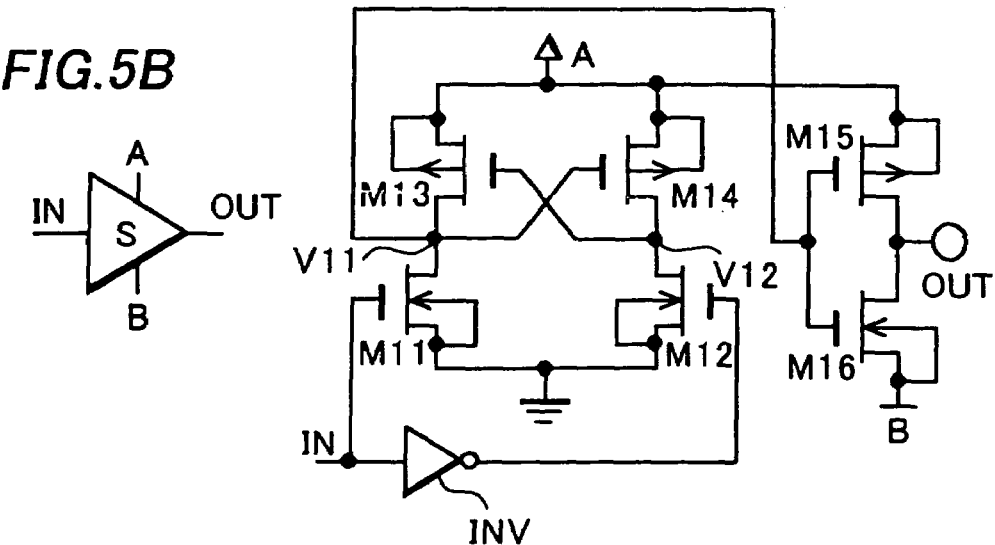
Figure 5C:
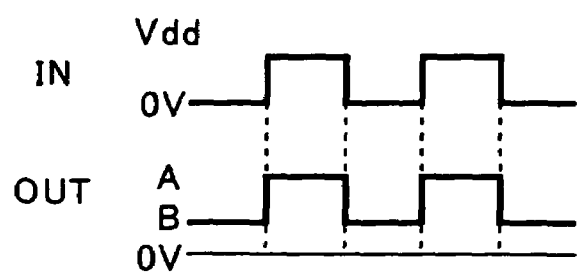
FIG. 5C shows operation waveforms of the non-inverting level shift circuits.

Next, the circuit diagrams of the non-inverting level shift circuits S3 and S4 are shown in FIGS. 5A and 5B, and operation waveforms of the non-inverting level shift circuits S3 and S4 are shown in FIG. 5C. The non-inverting level shift circuits S3 and S4 are different from the inverting level shift circuits S1 and S2 in that the gate of the MOS transistor M15 which is pulled up to the electric potential A is supplied with the voltage V11 while the gate of the MOS transistor M16 which is pulled up to the electric potential B is supplied with the voltage V12 (Refer to FIG. 5A). The pull-up MOS transistors M15 and M16 may be modified into an inverter configuration, as shown in FIG. 5B.

The non-inverting level shift circuits S3 and S4 perform a non-inverting level shift operation on an input voltage IN, as shown in the operation waveforms in FIG. 5C.

The inverting level shift circuits S1 and S2 and non-inverting level shift circuits S3 and S4 are connected in the charge pump circuit as described below. A clock pulse CLK' is inputted to the inverting level shift circuit S1 through a clock driver 110 while a clock pulse CLKB' is inputted to the inverting level shift circuit S2 through a clock driver 111. The clock pulses CLK' and CLKB' are generated from the clock pulses CLK and CLKB to have shorter "Low" periods than CLK and CLKB in order to prevent a reverse current through the charge transfer MOS transistors M1–M4.

Figure 6:
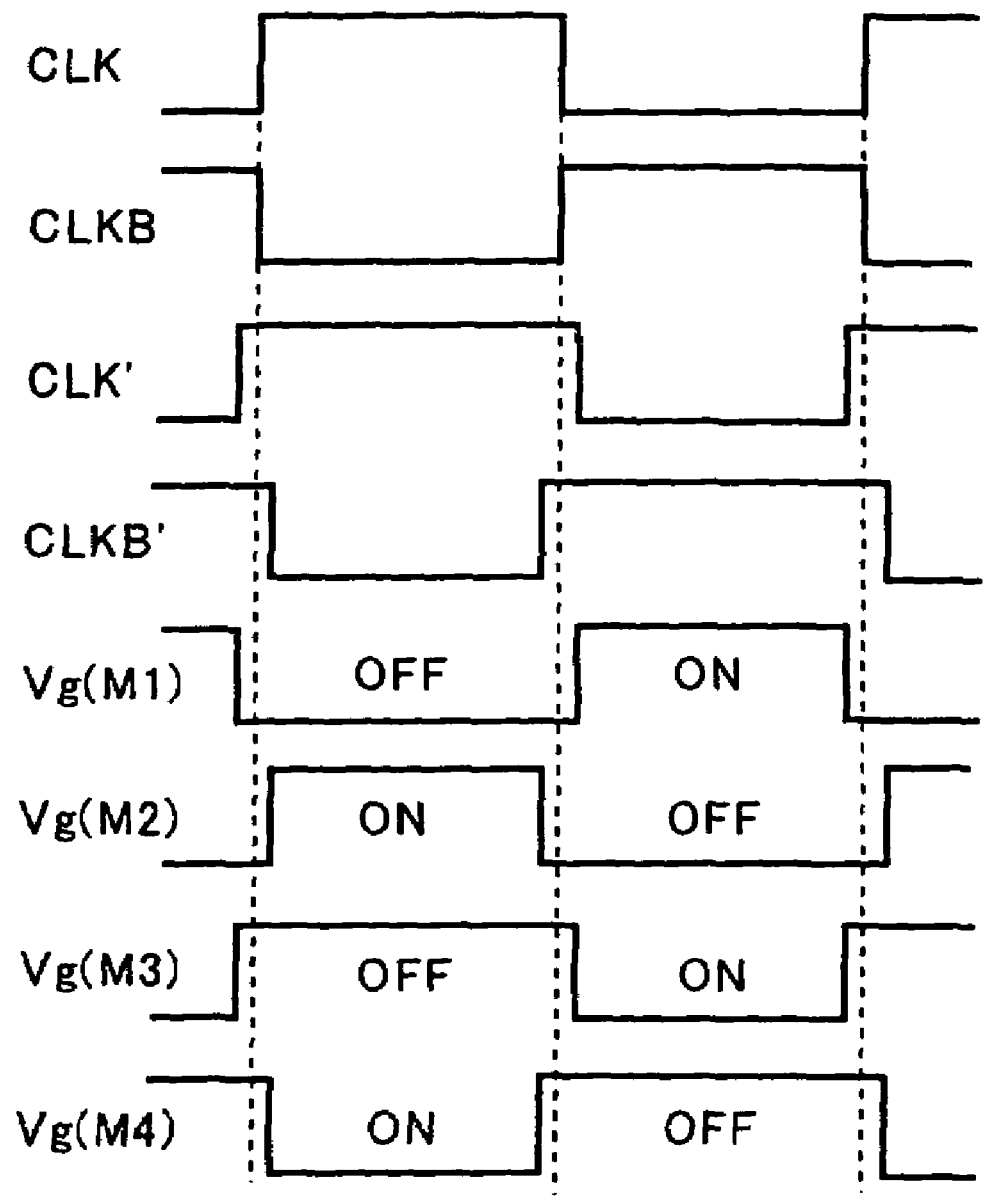
FIG. 6 shows phase correlation among clock pulses and signals shown in FIG. 1.

That is, the voltage at each of the pumping nodes is boosted by changes in the clock pulses CLK and CLKB after the charge transfer MOS transistors M1–M4 are completely turned off. The relationship among the phases of these clock pulses is shown in FIG. 6.

As shown in FIG. 1, the boosted voltage V2 at the pumping node one stage forward is fed back and used as a high voltage (electric potential A) power supply to the inverting level shift circuit S1.

Similarly, the boosted voltage V3 at the pumping node one stage forward is fed back and used as the high voltage (electric potential A) power supply to the inverting level shift circuit S2. As a low voltage (electric potential B) power supply, Vdd is applied to the inverting level shift circuit S1 while V1 is applied to the inverting level shift circuit S2.

On the other hand, the voltage V1 at the pumping node one stage backward is used as the low voltage (electric potential B) power supply to the non-inverting level shift circuit S3, and the voltage V2 at the pumping node one stage backward is used as the low voltage (electric potential B) power supply to the non-inverting level shift circuit S4. As the high voltage (electric potential A) power supply, V3 is applied to the non-inverting level shift circuit S3 while Vout is applied to the non-inverting level shift circuit S4.

In a steady state of the charge pump circuit with the configuration described above, the voltage Vgd between the gate and the drain of each of the charge transfer MOS transistors M1–M4 (when they are in ON state) can become 2 Vdd, as described below. First, following equations hold.

$Vgd(M1) = V2(\text{High}) - Vdd$ $Vgd(M2) = V3(\text{High}) - V1(\text{High})$ $Vgd(M3) = V1(\text{Low}) - V3(\text{Low})$ $Vgd(M4) = V2(\text{Low}) - Vout$ Next, following equations are further derived from the boosting operation of the charge pump in the steady state.

$V1(\text{High}) = 2\,Vdd,\ V1(\text{Low}) = Vdd$ $V2(\text{High}) = 3Vdd,\ V2(\text{Low}) = 2\,Vdd$ $V3(\text{High}) = 4\,Vdd,\ V3(\text{Low}) = 3\,Vdd,\ Vout = 4\,Vdd$ It is derived from these equations that the absolute values of Vgd of all the charge transfer MOS transistors in ON state become the same value 2 Vdd, as shown in Table 1. Therefore, the ON resistances of the charge transfer MOS transistors M1–M4 are reduced owing to the high Vgd, and the charge pump circuit with high efficiency and large output current capacity is realized. Furthermore, since the charge transfer MOS transistors M1–M4 may be designed to have a gate oxide of equal thickness which can withstand 2 Vdd, the MOS charge transfer transistors M1–M4 can be designed to have lower ON-state resistance than in the case where the voltage Vgd of the charge transfer MOS transistors is not uniform, leading to higher efficiency.

TABLE 1

| gate-drain voltage Vgd of the charge transfer MOS transistors | | | | |
|---|---|---|---|---|
| MOSFET | M1 | M2 | M3 | M4 |
| Vgd | 2 Vdd | 2 Vdd | 2 Vdd | 2 Vdd |

FIG. 6 is a timing chart showing the operation of the charge-pump circuit. The charge transfer MOS transistors M1–M4 repeatedly turn on and off in response to the clock pulses. The clock pulses CLK' and CLKB' which are applied to the inverting level shift circuits S1 and S2 and non-inverting level shift circuits S3 and S4 have duties different from 50%. That is, the period of "Low" is set to be shorter than the period of "High", as shown in FIG. 6. Therefore, an ON period of the charge transfer MOS transistors M1–M4 becomes shorter than an OFF period. The purpose is as follows.

Figure 7:
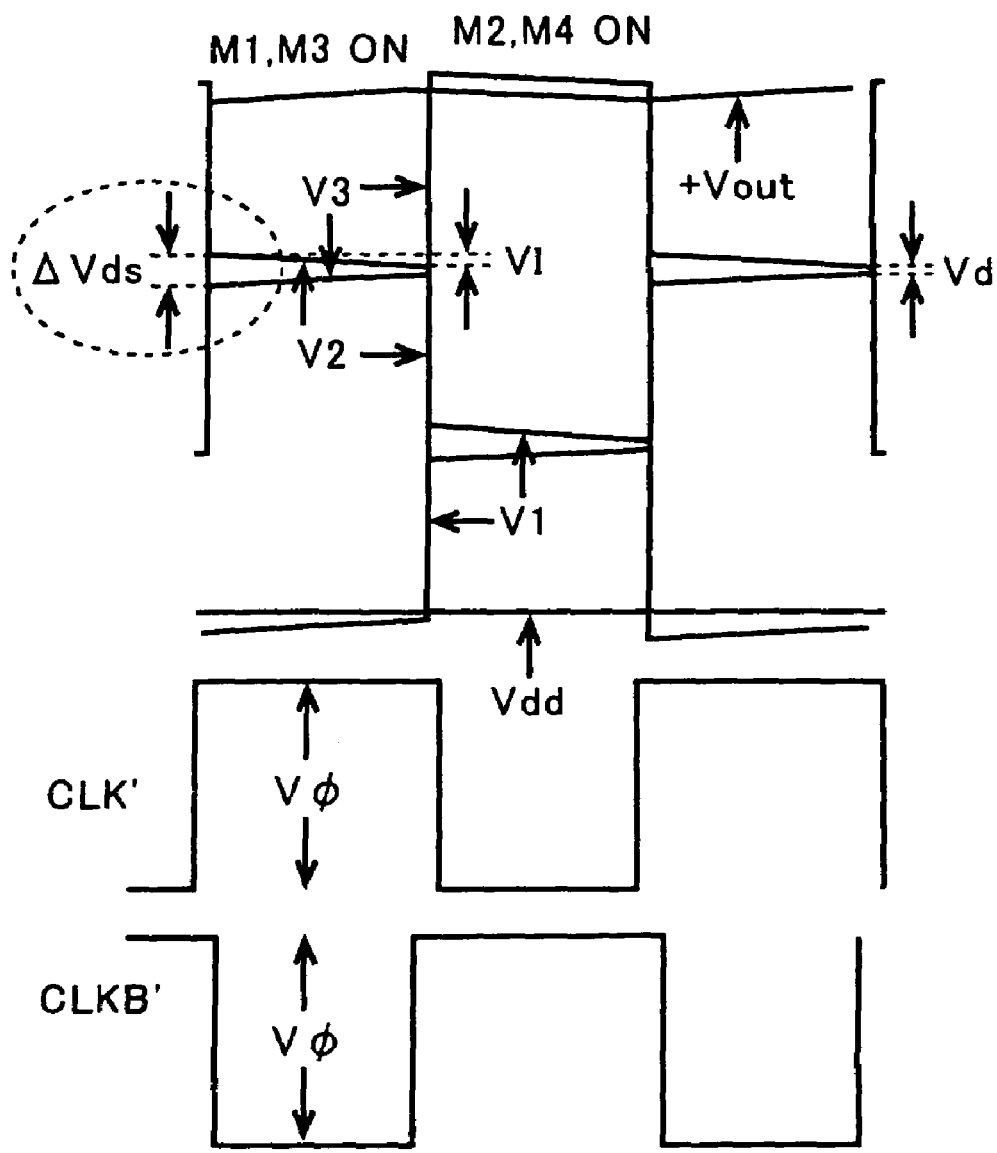
FIG. 7 shows voltage waveforms V1, V2 and V3 at pumping nodes shown in FIG. 1.

Since the charge transfer MOS transistors M1–M4 are not diode-connected, a reverse current may flow through them to deteriorate power efficiency. In order to prevent the reverse current, the ON period of the charge transfer MOS transistors M1–M4 is shortened and the clock pulses CLK and CLKB applied to the coupling capacitors C1–C3 are alternated to make pumping while the charge transfer MOS transistors M1–M4 are OFF. FIG. 7 shows voltage waveforms V1, V2 and V3 at each of the pumping nodes. Vφ denotes the amplitude of the clock pulses CLK' and CLKB', and ΔVds denotes a voltage between the drain and the source of each of the MOS transistors M1–M4.

Figure 8:
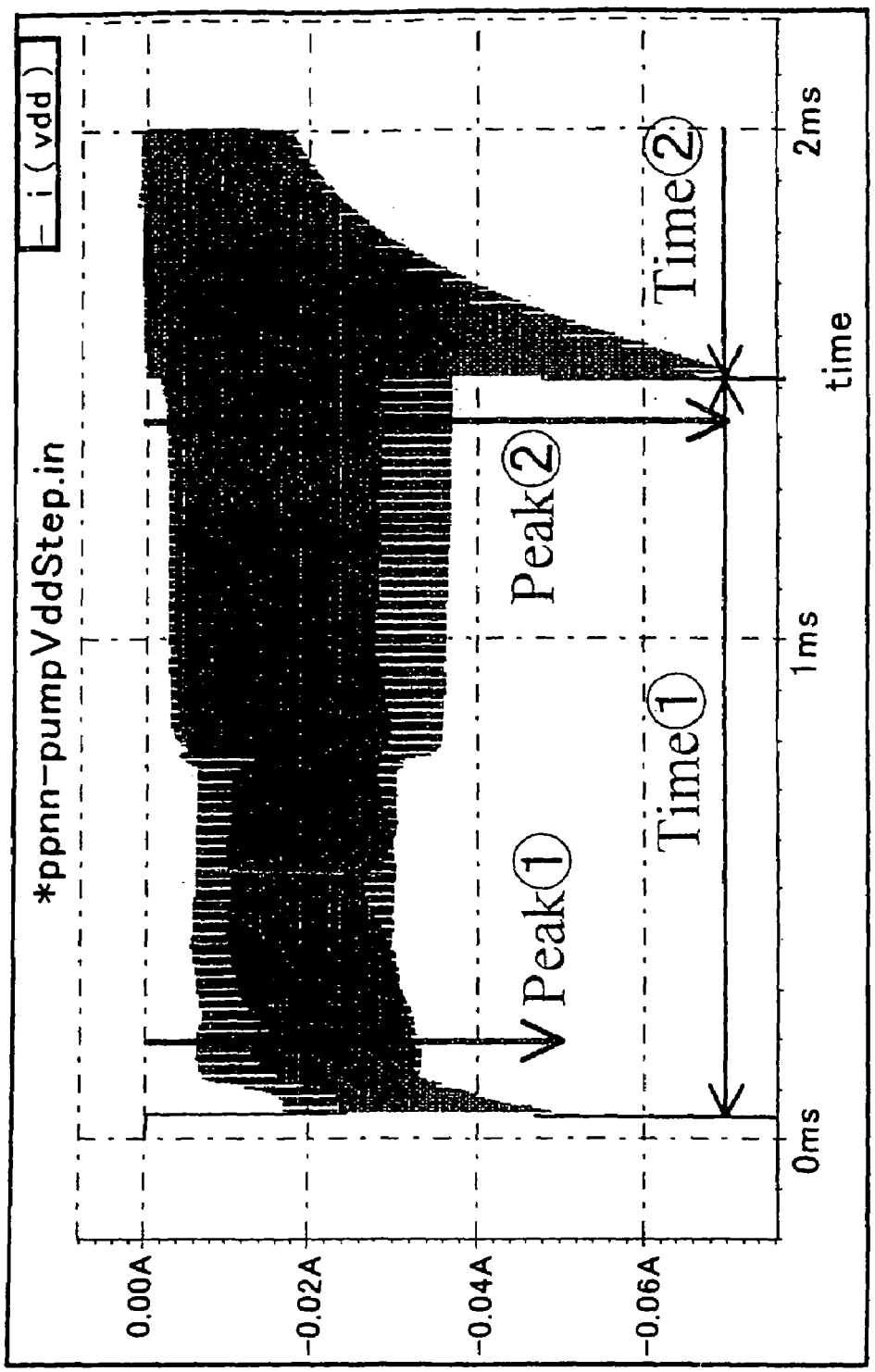
FIG. 8 shows results of simulation to confirm improvement in the inrush current of the charge pump circuit.

Next, a simulation to confirm improvement in the inrush current of the charge pump circuit according to this invention will be explained. FIG. 8 shows a result of the SPICE simulation. A horizontal axis represents time while a vertical axis represents the inrush current (power supply current of the charge pump circuit).

Time (1) in the figure denotes a period during which the first clock driver 70A having lower driving capacity is in operation and is about 1.5 msec in this example. Also, time (2) in the figure denotes a period during which the second clock driver 70B having higher driving capacity is in operation. The result of the simulation shows that the maximum inrush current is reduced to about 70 mA.

Peak (1) can be suppressed by reducing the driving capacity of the first clock driver 70A, if so desired. Peak (2) can be suppressed by extending the period of Time (1), if so desired.

Figure 9:
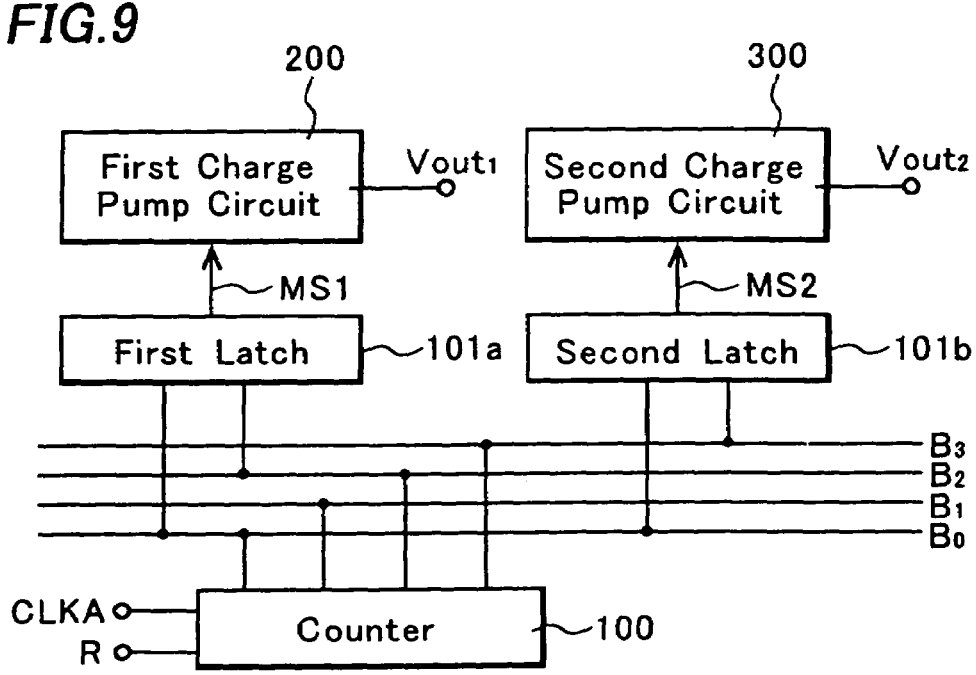
FIG. 9 is a circuit diagram of a charge pump circuit according to a third embodiment of this invention.
Figure 10:
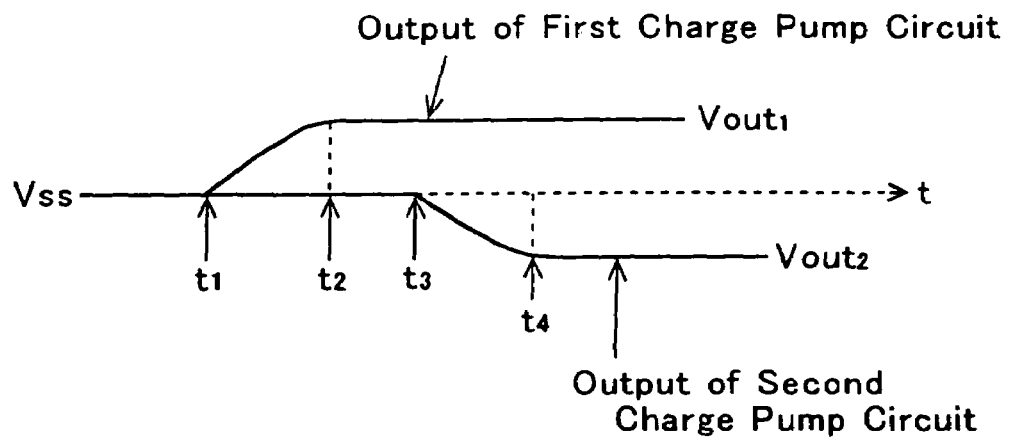
FIG. 10 is an operation timing chart of the charge pump circuit according to the third embodiment of this invention.
Figure 11:
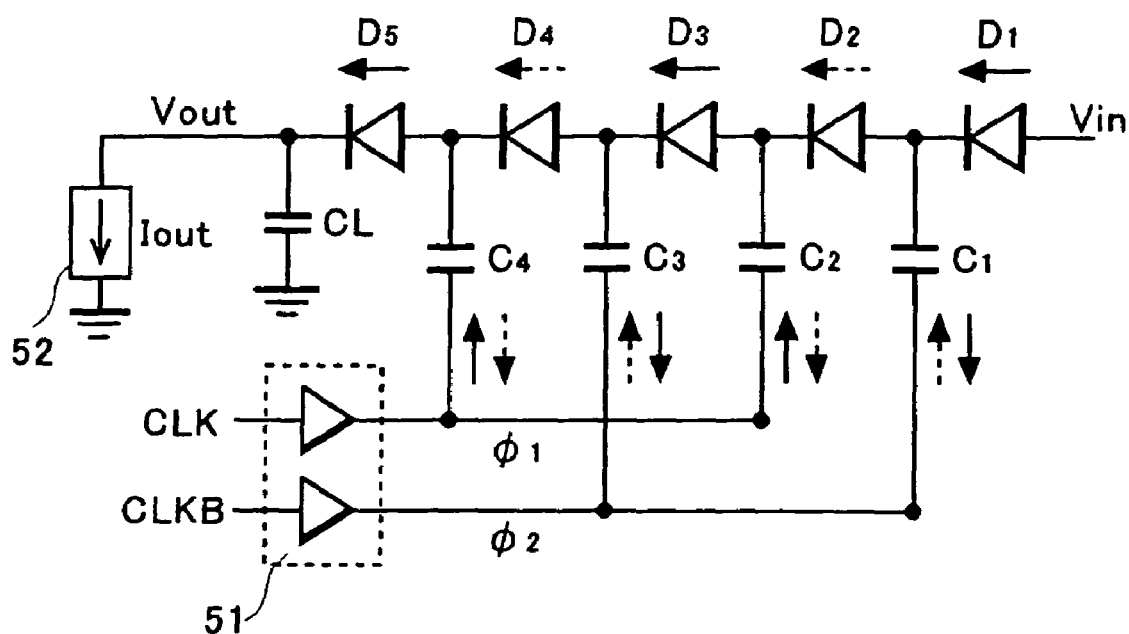
FIG. 11 is a circuit diagram of a four-stage Dickson charge pump circuit according to a conventional art.

The charge pump circuits in the embodiments described above are to reduce the inrush current in a single charge pump circuit. A charge pump circuit according to a third embodiment of this invention will be described next. FIG. 9 is a circuit diagram and FIG. 10 is an operation timing chart of the charge pump circuit according to the third embodiment of this invention. The third embodiment is to reduce the inrush current in the system having two charge pump circuits.

The charge pump circuit includes a first charge pump circuit 200 which outputs a first boosted voltage Vout1 and a second charge pump circuit 300 which outputs a second boosted voltage Vout2, as shown in FIG. 9. The first charge pump circuit 200 outputs a positive boosted voltage as in the charge pump circuits described in the preceding embodiments, while the second charge pump circuit 300 is structured to output a negative boosted voltage. The first charge pump circuit 200 and the second charge pump circuit 300 have clock drivers 70, 80 and 90 and control circuits 30, 40 and 50 as in the circuits shown in FIG. 1 and FIG. 3. And a counter 100 is structured similar to the circuit shown in FIG. 3. Outputs of the counter 100 are inputted to a first latch circuit 101a and a second latch circuit 101b.

Driving capacity of the clock drivers of the first charge pump circuit is switched by inputting a first mode switch signal MS1, which is an output of the first latch circuit 101a, to the first charge pump circuit 200. On the other hand, driving capacity of the clock drivers of the second charge pump circuit is switched by inputting a second mode switch signal MS2, which is an output of the second latch circuit 101b, to the second charge pump circuit 300.

The first latch circuit 11a is structured to switch the first mode switch signal MS1 to a low level when both B0 and B2 out of output bits B0–B3 of the counter 100 become "1" and retain the low level. Similarly, the second latch circuit 101b is structured to switch the second mode switch signal MS2 to a low level when both B0 and B3 out of the output bits B0–B3 of the counter 100 become "1" and retain the low level. By doing so, timings to switch the clock drivers of the first and the second charge pump circuits are controlled independently.

Next, an example of operation control of the charge pump circuit according to the third embodiment is described referring to FIG. 10. At first, the first charge pump circuit 200 starts operation at time t1 and a first clock driver 70A having lower driving capacity begins operation. When a count of the counter 100 reaches a first predetermined number at time t2, the first mode switch signal MS1, which is the output of the first latch circuit 101a, is turned to the low level and a second clock driver 70B having higher driving capacity begins operation in response to it. Next, the second charge pump circuit 300 starts operation at time t3 and a third clock driver having lower driving capacity, which corresponds to the first clock driver 70A, begins operation. When the count of the counter 100 reaches a second predetermined number at time t4, the second mode switch signal MS2, which is the output of the second latch circuit 101b, is turned to the low level and a fourth clock driver having higher driving capacity, which corresponds to the second clock driver 70B, begins operation in response to it.

According to this embodiment, therefore, the driving capacities of the clock drivers of the two charge pump circuits can be controlled independently, using the single counter 100. As a result, in addition to reducing the inrush current in each of the charge pump circuits, a peak value of the inrush current in the whole system can be reduced by displacing timings of occurrence of the inrush current in the two charge pump circuits from each other.

The system including two charge pump circuits is described in the embodiment. A system including three or more charge pump circuits can be formed similarly. Also, each charge pump circuit may be one which outputs positive boosted voltage or one which outputs negative boosted voltage.

Furthermore, in any of the embodiments described above, in addition to the first clock driver 70A having lower driving capacity and the second clock driver 70B having higher driving capacity, one or more than one clock drivers having intermediate driving capacity may be added so that the capacity of the clock driver is increased by switching the clock drivers from lower driving capacity to higher driving capacity successively.

What is claimed is:

1. A charge pump circuit comprising:
   a plurality of charge transfer transistors connected in series;
   a plurality of capacitors each having one end connected to a corresponding connecting point of the charge transfer transistors;
   a first clock driver for supplying clock pulses to the other end of the capacitor;
   a second clock driver for supplying clock pulses to the other end of the capacitor and having higher driving capacity than the first clock driver; and
   a clock driver control circuit for initiating operation of the first clock driver when the charge pump circuit starts operating and initiating operation of the second clock driver after a predetermined elapsed time, wherein the clock driver control circuit stops operation of the first clock driver at an end of the predetermined elapsed time, wherein an output voltage is obtained from one of the plurality of charge transfer transistors and further wherein the clock driver control circuit comprises a comparator which compares a voltage corresponding to the output voltage with a predetermined reference voltage and a control circuit which controls the first clock driver and the second clock driver according to an output signal of the comparator.

2. The charge pump circuit of claim 1, wherein the predetermined reference voltage is equal to a power supply voltage.

3. The charge pump circuit of claim 1, wherein the comparator is a hysteresis comparator.

4. The charge pump circuit of claim 1, wherein the voltage corresponding to the output voltage is obtained by dividing the output voltage by resistors.

5. The charge pump circuit of claim 1, wherein the clock driver control circuit comprises a counter which counts the clock pulses and a control circuit which controls the first clock driver and the second clock driver according to an output signal of the counter.

6. A charge pump circuit comprising:
   a first charge pump circuit comprising a first clock driver and a second clock driver having higher driving capacity than the first clock driver;
   a second charge pump circuit comprising a third clock driver and a fourth clock driver having higher driving capacity than the third clock driver; and
   a clock driver control circuit for initiating the first clock driver when the charge pump circuit starts operating, initiating the second clock driver after a first predetermined elapsed time and then initiating the third clock driver and initiating the fourth clock driver after a second predetermined elapsed time.

7. The charge pump circuit of claim 6, wherein the clock driver control circuit comprises a counter which counts clock pulses and a control circuit which controls the first clock driver, the second clock driver, the third clock driver and the fourth clock driver according to an output signal of the counter.

* * * * *